United States Patent
Stautmeister

(10) Patent No.: US 9,453,728 B2
(45) Date of Patent: Sep. 27, 2016

(54) OPTICAL MEASUREMENT SYSTEM FOR DETERMINING DISTANCES

(75) Inventor: Torsten Stautmeister, Dresden-Langebrueck (DE)

(73) Assignee: MICRO-EPSILON Optronic GmbH, Langebrueck (DE)

( * ) Notice: Subject to any disclaimer, the term of this patent is extended or adjusted under 35 U.S.C. 154(b) by 264 days.

(21) Appl. No.: 13/818,274

(22) PCT Filed: Sep. 7, 2011

(86) PCT No.: PCT/DE2011/001692
§ 371 (c)(1),
(2), (4) Date: Feb. 21, 2013

(87) PCT Pub. No.: WO2012/075978
PCT Pub. Date: Jun. 14, 2012

(65) Prior Publication Data
US 2013/0148099 A1    Jun. 13, 2013

(30) Foreign Application Priority Data
Sep. 13, 2010   (DE) ........................ 10 2010 045 097

(51) Int. Cl.
*G01C 3/08*   (2006.01)
*G01B 11/25*  (2006.01)
(Continued)

(52) U.S. Cl.
CPC ................ *G01C 3/08* (2013.01); *G01B 11/25* (2013.01); *G01S 7/4814* (2013.01); *G01S 17/08* (2013.01)

(58) Field of Classification Search
CPC ................................. G01C 3/08; G01B 11/24
USPC ............ 356/3.01–3.15, 4.01–4.1, 5.01–5.15, 356/6–22, 28, 28.5
See application file for complete search history.

(56) References Cited

U.S. PATENT DOCUMENTS

2002/0040971 A1   4/2002  Ono
2002/0055082 A1   5/2002  Durbin et al.
(Continued)

FOREIGN PATENT DOCUMENTS

DE    10153760 A1   5/2003
DE    10336666 A1   3/2005
(Continued)

OTHER PUBLICATIONS

Bachman, C.G., "Chapter 2: LADAR Performance Prediction," *Laser Radar Systems and Techniques*, 1979, pp. 9 and 10, Artech House, Inc., Dedham, MA.
(Continued)

*Primary Examiner* — Luke Ratcliffe
(74) *Attorney, Agent, or Firm* — Alston & Bird LLP

(57) ABSTRACT

A measuring system for determining a distance between a sensor device and a measured object, wherein the sensor device comprises a light source for generating an illumination light beam and a detector for detecting a portion of the illumination light beam reflected on the surface of the measured object and wherein the measured object is designed so it is transparent at least for a wavelength range of the visible light, is designed and further developed under consideration of the most reliable distance measurement possible in all types of measuring situations, that the illumination light beam has a wavelength in the violet or ultraviolet range and that the measured object is designed in such a way that the illumination light beam is diffusely reflected on the surface of the measured object. In addition, a corresponding measuring system is specified for measuring measured objects that are essentially impermeable to light.

24 Claims, 2 Drawing Sheets

(51) Int. Cl.
*G01S 7/481* (2006.01)
*G01S 17/08* (2006.01)

(56) References Cited

U.S. PATENT DOCUMENTS

| | | | |
|---|---|---|---|
| 2003/0069350 A1 | 4/2003 | Kazutoshi et al. | |
| 2004/0027554 A1* | 2/2004 | Ishinabe et al. | 356/5.1 |
| 2005/0003104 A1 | 1/2005 | Neumann et al. | |
| 2006/0262310 A1* | 11/2006 | Starry et al. | 356/429 |
| 2008/0225303 A1* | 9/2008 | Lampalzer | 356/612 |
| 2011/0133102 A1* | 6/2011 | Bamberg et al. | 250/461.1 |

FOREIGN PATENT DOCUMENTS

| | | |
|---|---|---|
| DE | 102004025490 A1 | 12/2005 |
| DE | 102007003024 A1 | 7/2008 |
| DE | 102007029440 A1 | 1/2009 |
| EP | 2189752 A1 | 5/2010 |
| JP | 2000-009442 A | 1/2000 |
| JP | 2000-249546 A | 9/2000 |
| JP | 2001-013049 A | 1/2001 |
| WO | WO 02/066924 A1 | 8/2002 |

OTHER PUBLICATIONS

International Searching Authority, International Search Report for International Application No. PCT/DE2011/001692, mailed Mar. 30, 2012, 9 pages, European Patent Office, The Netherlands.
International Searching Authority, Written Opinion for International Application No. PCT/DE2011/001692, mailed Mar. 30, 2012, 8 pages, European Patent Office, Germany.
International Searching Authority, Written Opinion for International Application No. PCT/DE2011/001692, mailed Mar. 30, 2012, 10 pages, European Patent Office, Germany.

\* cited by examiner

OPTICAL MEASUREMENT SYSTEM FOR DETERMINING DISTANCES

CROSS REFERENCE TO RELATED APPLICATIONS

This application is a National Stage application, filed under 35 U.S.C. §371, of International Application PCT/DE2011/001692, filed Sep. 7, 2011, which claims priority to German Application No. 10 2010 045 097.9, filed Sep. 13, 2010, both of which are hereby incorporated by reference in their entirety.

BACKGROUND

1. Technical Field

The invention relates to a measuring system for determining a distance between a sensor device and a measured object, wherein the sensor device comprises a light source for generating an illumination light beam and a detector for detecting a portion of the illumination light beam reflected on the surface of the measured object and wherein the measured object is designed so it is transparent at least for a wavelength range of the visible light.

The invention also relates to a measuring system for determining a distance between a sensor device and a measured object, wherein the sensor device comprises a light source for generating an illumination light beam and a detector for detecting a portion of the illumination light beam reflected on the surface of the measured object and wherein the measured object is designed in such a way that visible light is reflected directly.

2. Description of Related Art

Optical measuring systems have wide-ranging applications in practice. The contactless measurement that is precise and still fast opens up a number of application areas in which the distance between a measured object and a sensor device will be measured contactlessly or measure a measured object without wear. One important application area is quality assurance, in which the quality of a workpiece is tested.

In optical measuring systems, a measured object is illuminated with an illumination light beam—very frequently a red or infrared laser beam—and the portion of the illumination light beam reflected on the measured object is detected with a detector. Various methods are known from experience, according to which the distance of the measured object from the sensor device can be determined with such a sensor device. Reference is made to a triangulation measurement as an example.

The known measuring systems from the state of the art are always problematic if measurements are done on transparent or partially transparent measured objects. In this context, transparent means that broad spectral portions of the visible light (wavelength range between 400 nm and 800 nm) can pass through the measured object. During the passage, the spectral portions are only attenuated to a slight extent. Partially transparent means that at least one spectral portion of the visible light can pass through the measured object while another spectral portion of the visible light is absorbed or reflected completely or to an extent that is not inconsiderable.

If an illumination light beam falls on measured objects of this type, it is reflected directly, i.e. the angle of incidence of the illumination light beam on the surface of the measured object is equal to the angle of reflection of the reflected illumination light beam. Scatter in other spatial directions practically does not exist. Because of this, sensor device and measured object must be aligned to each other optimally so that a measurement leads to results that are usable. If the surface of the measured object is tipped out of the optimal position only slightly, the illumination light beam is not reflected to the detector. The measuring process fails and is considerably unstable. An optimal alignment of the sensor device and of the measured object with respect to each other is practically impossible to ensure, especially in quality assurance in manufacturing environments. This alignment is practically impossible with curved or rounded measured objects. Similar problems occur with optical measurement on non-transparent measured objects that do not reflect light directly because of their surface finish. The problems are comparable here. As an example, reference is made to mirroring surfaces.

BRIEF SUMMARY

With regard to advantageous designs of the device according to the invention, reference is made to the detailed section of the description and to the attached claims for the sake of preventing repetitious disclosure.

BRIEF DESCRIPTION OF THE DRAWINGS

There are now various possibilities for designing and further developing the teaching of the present invention in an advantageous manner. For this purpose reference is made, on one hand to the claims subordinate to Claims 1 and 5 and, on the other, to the explanation below of a preferred exemplary embodiment of the invention using the drawings. In connection with the explanation of the preferred exemplary embodiment of the invention using the drawings, designs and further developments of the teachings that are generally preferred are explained. In the drawings

DETAILED DESCRIPTION

The diagrams shown in the two figures have been determined using the same measuring setup. Together with a lens, a laser generates a focused laser beam which is deflected to a vehicle headlight glass—measuring object—from approx. 2 mm thick plastic-glass. The laser beam is at least partially reflected on a surface of the measured object and goes through another lens, a wavelength-selective filter that is adapted to the wavelength of the illumination light beam and a shade for a line detector. The sensor device performs a measurement according to the triangulation method. The measured object is provided with a coating that is impermeable to ultraviolet light on the surface that is turned toward the sensor device.

Figure 1:
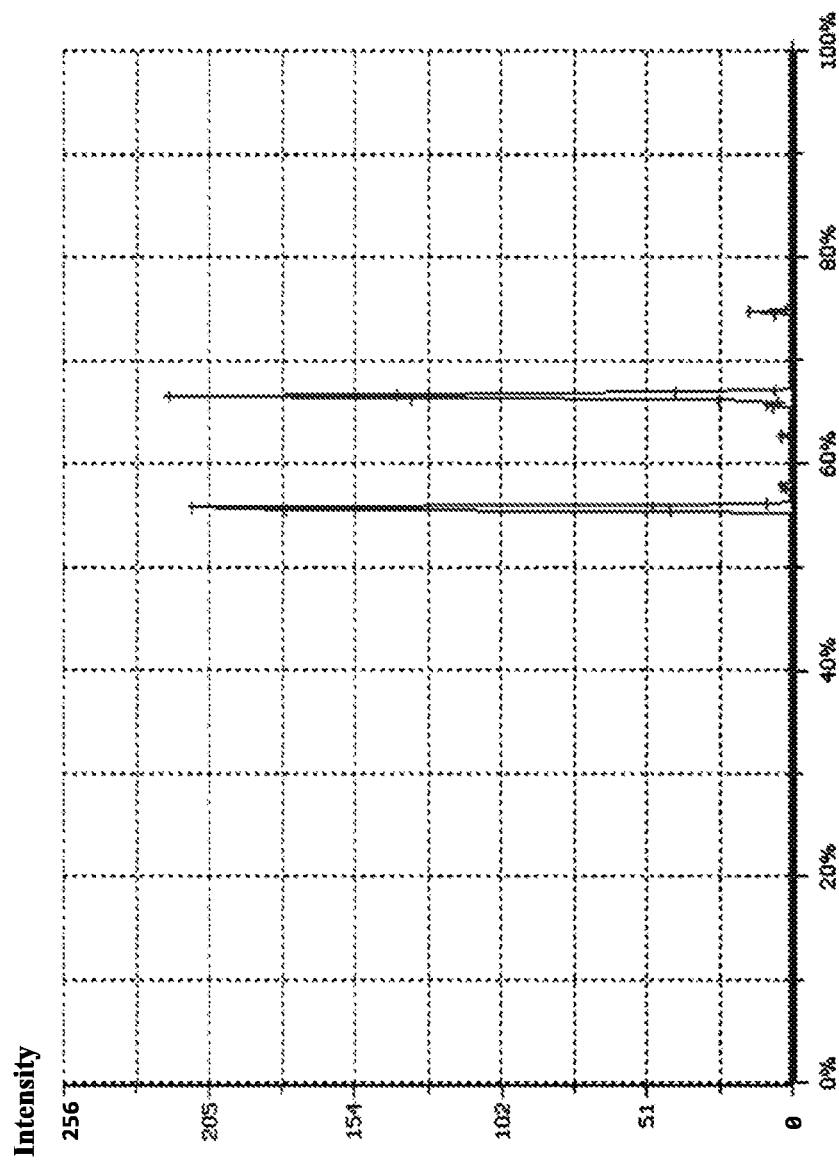
FIG. 1 shows an intensity distribution along a detector with the use of a red illumination light beam with a wavelength of 670 nm and FIG. 2 shows an intensity distribution along a detector with the use of a violet illumination light beam with a wave length of 405 nm in a measuring system according to the invention.

FIG. 1 shows an intensity distribution with the use of a red laser with an emission wavelength of 670 nm according to the state of the art. For one thing, an optimal alignment of the measured object and the sensor device with respect to each other is necessary. For another, two pronounced main peaks are present in the intensity distribution. The left peak in FIG. 1 originates from the reflection of the illumination light beam on the surface of the measured object, which is turned toward the sensor device. With the right peak, the illumination light beam penetrates into the measured object and is reflected at the surface of the measured object that is turned away from the sensor device. Because of this, the measurement is no longer unambiguous. Another problem consists in that the right peak is higher than the left peak. If in a simplified manner, an evaluation of the intensity curve is performed based on the highest peak, erroneous distance values result. If the intensity of the illumination light beam and illumination time are regulated based on the highest peak, unstable measurements can even occur. Because of object tipping, the intensity of the first peak may be so low that it is no longer evaluated by the sensor device and thus an erroneous measurement occurs with respect to the reverse side of the measured object or to internal reflection points. The smaller peaks, which can be seen in the intensity distribution according to FIG. 1, result from multiple reflections in the measured object.

Figure 2:
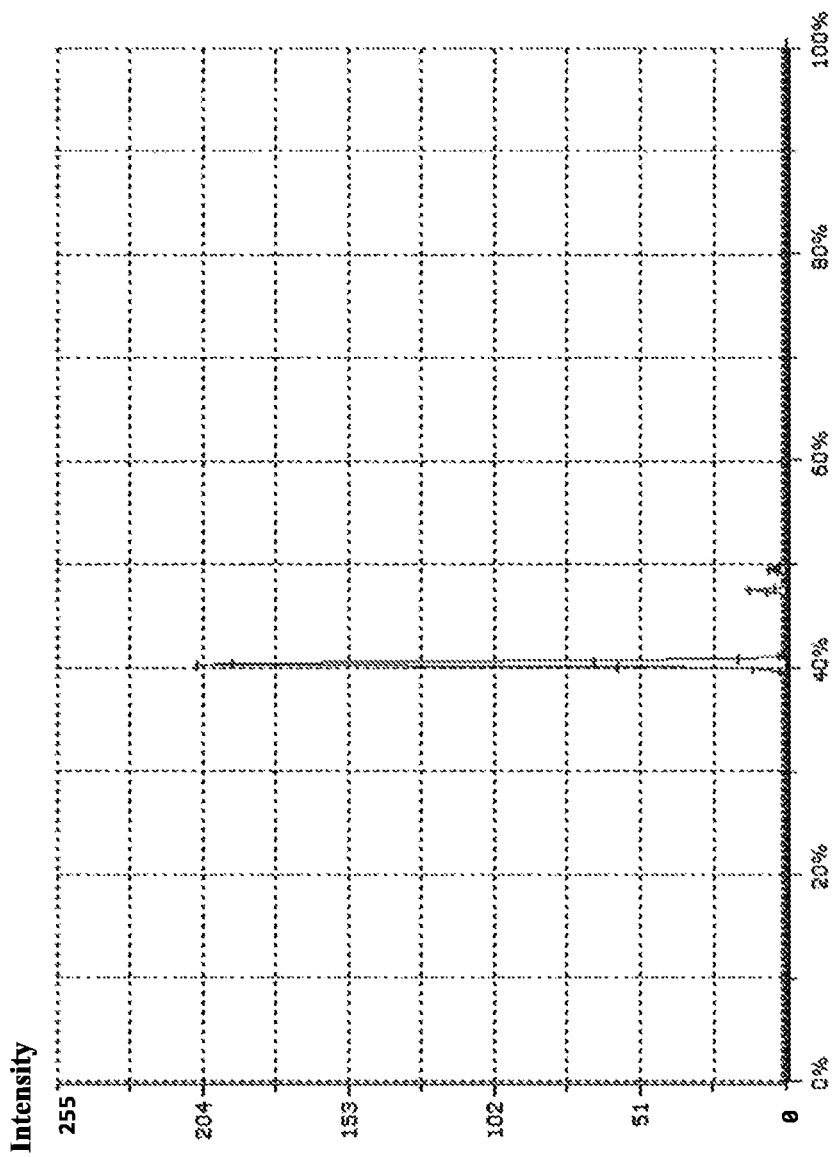

FIG. 2 shows the use according to the invention of a violet laser with a wavelength of 405 nm. Because of the diffuse reflection on the surface of the measured object, the sensor device and the measured object can be positioned more freely. In addition, in the intensity distribution according to FIG. 2, only one individual peak is expressed. A very small additional peak indicates that a small portion of the illumination light beam penetrates into the measured object and is reflected on the surface of the measured object that is turned away from the sensor device. However, the intensity is so low that the additional peak is of no consequence. Multiple reflections do not occur.

Thus the present invention is based on the object of designing and further developing measuring systems of the type named at the beginning for transparent, partially transparent or non-transparent measured objects in such a way that a reliable optical distance measurement can be performed even on measured objects on the surface of which a direct reflection occurs.

According to the invention, the object above for measurement on transparent and semi-transparent measured objects is achieved by the characteristics of Claim 1. According to this, the measuring system being discussed is characterized in that the illumination light beam has a wavelength in the violet or ultraviolet range and that the measured object is designed in such a way that the illumination light beam is diffusely reflected on the surface of the measured object.

During measurement for non-transparent measured objects, the object above is achieved using the characteristics of Claim 5. According to this, the measuring system being discussed is characterized in that the illumination light beam has a wavelength in the violet or ultraviolet range and that a coating is applied on a surface of the measured object because of which the illumination light beam is diffusely reflected on the surface of the measured object.

In the manner according to the invention, it is first recognized that transparent or semi-transparent measured objects very often have the characteristic that they are designed so they are impermeable to light in the violet or ultraviolet wavelength range or greatly attenuate light. Usually this characteristic is purposely brought about as a protective measure. In particular, plastics have the tendency to lose their transparency with very prolonged irradiation with ultraviolet light. To prevent this effect, the plastics are treated in such a way that violet and/or ultraviolet light does not penetrate into the material, or barely penetrates. Rather, violet and/or ultraviolet light is diffusely reflected on the surface of the material. The light impermeability or strong light attenuation of these measured objects is used in the measuring system according to the invention.

According to the invention, for the illumination light beam, a light beam is used that has a wavelength in the violet or ultraviolet range. Because of the combination of the illumination light beam with the measured object named, the illumination light beam being reflected not directly, but diffusely, is achieved in a surprisingly simple way. Because of this, a measurement can be performed with an optical measuring system on transparent or semi-transparent measured objects without the optical properties of the measured object in the visible range being influenced.

According to the invention, this combination of characteristics can also be used in the measurement of non-transparent measured objects, i.e. for measured objects that are practically impenetrable to visible light and on which visible light is reflected directly. For this purpose, according to the invention, a coating is applied to the measured object that is impermeable to violet and/or ultraviolet light or attenuates the violet or ultraviolet light to a non-inconsiderable extent. Because of this, a diffuse reflection of the violet or ultraviolet illumination beam occurs on the surface of the measured object.

Because of the diffuse reflection of the illumination light beam on a surface of the measured object—transparent, semi-transparent or non-transparent—the illumination light beam is no longer reflected in one spatial direction, rather in an angular range around the light beam of the direct reflection. Because of this, the measured object and the sensor device no longer have to be aligned precisely to each other and the usage area of this measuring system is clearly expanded. Measuring situations that are definitely more stable can be achieved.

The surface of the measured object, on which the illumination light beam is reflected, is preferably the outer surface of the measured object turned toward the sensor device. In principle, with transparent measured objects, it is also conceivable for the illumination light beam to first penetrate the measured object and then to be reflected in the direction of the detector on the surface turned away from the sensor device or any separating plane arranged in the measured object. However, preferably measured objects are used in which the illumination light beam does not penetrate into the measured object or only does so slightly.

With a transparent or semi-transparent measured object, the diffuse reflection of the illumination light beam can be caused by a special coating on the measured object. Coatings that are suitable for this, which are impermeable or highly attenuating in the violet and/or ultraviolet range, are known from experience. By way of a non-limiting example, reference is made to coated plastic-glass.

However, it is also conceivable that the measured object already has the required characteristic because of its material composition and violet and/or ultraviolet light cannot penetrate noticeably into the measured object. Corresponding materials that are transparent to visible light and impermeable in the violet and/or ultraviolet range are known from experience.

In a preferred exemplary embodiment of the measuring system according to the invention, the measured object consists of transparent plastic parts or coated glass from the automotive industry. In an especially preferred manner, the measuring system is used for measuring lenses or disks of a vehicle headlight or a tail light.

Preferred exemplary embodiments with non-transparent measured objects relate to the measurement of plastics, polished metal plates or other objects designed differently from metal, which are impermeable to light. However, wood, woody materials or paper can be non-transparent objects. The measured object does not have to be completely impermeable to light. In principle, the measured object can also be translucent.

Preferably, the measured objects—transparent, semi-transparent or non-transparent—are designed so that they are impermeable or highly attenuating for light with a wavelength of less than 420 nm. In an especially preferred manner, they are impermeable or highly attenuating for light with a wavelength of less than or equal to 390 nm.

For especially good optical behavior of the sensor device, the light source can be formed by a laser that emits a laser beam as illumination light beam. In this case, laser diodes can be used as well as solid or gas lasers. However, for especially cost-effective measuring systems, the light source can also be made up of an LED. In many application areas, the reduced light quality is adequate.

The illumination light beam preferably has a wavelength less than or equal to 425 nm. In an especially preferred manner, an illumination light beam with a wavelength less than or equal to 405 nm is used. In a very especially preferred manner, the wavelength of the illumination light beam is less than or equal to 390 nm. Generally, light sources up to extremely short-wavelength UV light can be used. However, light sources of this type are very expensive and safe operation of the measuring system is very complicated because of special protective measures. Therefore, limits are set for the wavelength. Minimum wavelengths that are currently reasonable to use technically lie at 300 nm.

The illumination light beam preferably illuminates the measured object in a spot shape or linear shape. The spots or lines can also be combined to form patterns like crossed lines or several parallel lines. Preferably the lines of the illumination are straight.

Preferably, in the beam path of the illumination light beam a focusing device is arranged after the light source, with which the illumination light beam is focused. Light source and focusing device together form an illumination unit. Preferably the illumination light beam is focused on the surface of the measured object. However, it would also be conceivable to focus the illumination light beam to infinity or to other points on the optical axis.

As a detector, a CMOS (Complimentary Metal Oxide Silicon) Array or a CCD (Charge Coupled Device) Array can be used. The array is preferably a linear array or an area array (i.e., with two-dimensional expansion). For example, linear arrays can be used for spot-shaped distance measurements and area arrays can be used for distance measurement according to the grid intersection method. In some cases, the detector can also be formed of a conventional line scan or matrix camera.

For spot-shaped distance measurements, a PSD (Position Sensitive Diode) or a APD (Avalanche PhotoDiode) can be used. In particular, APDs can be used for distance measurements by measuring running time or phase shift. PSDs or APDs can be mounted in an array.

To block outside radiation, in the detection channel, i.e. the beam path of the portion of the illumination light beam reflected on a surface of the measured object inside the sensor device, a wavelength-selective element can be mounted before the detector. Because of the wavelength-selective element, ambient light, for example, can be kept away from the detector that is sensitive to broadband. The wavelength-selective element can be designed as a filter (e.g., an interference filter) or a dispersive element. However, for example for reducing the construction size of the sensor device, the wavelength-selective element can also be designed as a dichroic minor for beam deflection/folding.

Generally it makes sense to adapt the entire optical channel, i.e. the path that the illumination light beam takes from the light source to the detector, to the wavelength of the illumination light.

In order to further improve the wavelength selection, a combination of several wavelength-selective elements is also conceivable. For example, several dispersive elements can be arranged in succession. However, preferably different types of wavelength-selective elements are combined with each other. This means the combination of a filter or a dispersive element with a dichroic minor is possible.

Preferably, the measuring system comprises an evaluation unit that is connected to the sensor device and receives measuring signals of the sensor device. The evaluation device may receive additional information regarding the illumination light beam, for example if the illumination light beam is modulated. Based on the received light beam (i.e., the portion of the illumination light beam reflected and received at the detector) and possibly based on the knowledge about the illumination light beam itself, the evaluation device performs a determination of a distance between the sensor device and the measured object. Determination of the distance can occur, for example, by calculation or by reading values out from a table, the contents of which have been determined in calibration measurements and stored in the evaluation unit.

In addition to, or alternatively to the information about the illumination light beam, the evaluation unit can receive information regarding the intensity of the light reflected from the measured object and regulate according to the intensity of the light source by means of a control unit and/or adjust the integration time of the detector and/or a signal amplifier mounted in the detector branch.

Sensor device and evaluation can be designed in such way that distance measurement is performed according to the triangulation process. For this purpose, light source and detector are arranged in such a way that the light source, the illuminated spot on the surface of the measured object and the illuminated spot on the detector form a triangle. With knowledge of the sensor device, the distance of the illuminated spot on the surface of the measured object can be calculated by the sensor device.

Sensor device and evaluation unit can also be designed in such a way that a distance measurement can be determined using a measurement of the light running time. To do this, how much time required for a light beam from the light source to the measured object and to the detector is measured. With knowledge of the speed of the light, the distance can be determined from this.

Another possible design of the sensor device and the evaluation unit consists in that a phase shift is measured. To do this, the brightness of the illumination light beam is modulated with a suitable frequency and the changes in brightness of the illumination light beam and of the received light beam are compared to each other. Decisions about the light running time, and thus on the distance between sensor device and measured object, can be made from the mutual phase position.

The evaluation unit can combine several distance measurements in such a way that a profile of the measured object and/or a part of the measured object occurs. To do this, distance values are brought into a relationship with the position of the measuring points on the measured object. If the sensor device operates, e.g. according to the grid intersection method, a profile along a line can be determined with one measurement. If the line passes over the measured object, the three-dimensional structure of the measured object or a part of the measured object can be determined. For a profile measurement, sensor device and measured object can also be designed so they can move with respect to each other. However, it is also possible for the illumination light beam to be moved over the measured object with a deflecting device. Appropriate scanning devices are known from experience.

According to an especially preferred exemplary embodiment, the invention relates to a measuring system according to the triangulation principle that is used for measuring distances with respect to objects, which partially absorb and partially reflect UV light because of a coating or their material composition. An illumination unit (e.g., laser diode with focusing optics) sends focused light with an emission wavelength in the UV range. A selection of this wavelength from other wavelengths in the received beam path occurs using optical filters, dispersive elements and/or dichroic mirrors with appropriate shades. Parts of the light emitted are reflected diffusely by the surface of the object and/or from the object in the received beam path.

Finally, it should be explicitly indicated that the exemplary embodiments described above of the device according to the invention are used only to explain the teaching claimed, but not to restrict it to the exemplary embodiments.

The invention claimed is:

1. Measuring system for determining a distance between a sensor device and a measured object, wherein the sensor device comprises a light source for generating an illumination light beam and a detector for detecting a portion of the illumination light beam reflected on the surface of the measured object, wherein the measured object has a surface that is transparent at least for a wavelength range of visible light, wherein the illumination light beam has a wavelength in at least one of the violet range and the ultraviolet range, and wherein the measured object is configured such that the illumination light beam is diffusely reflected at the surface of the measured object in such a manner that, simultaneously with the diffuse reflection of the illumination beam, the optical properties of the measured object in the visible range, permitting passage there-through of the visible light, remain uninfluenced by the illumination light beam.

2. Measuring system according to claim 1, wherein one surface of the measured object has a coating for creating the diffuse reflection of the illumination light beam, which is impermeable or at least highly attenuating in the violet and/or ultraviolet wavelength range.

3. Measuring system according to claim 1, wherein the measured object is designed of a material that is impermeable or at least highly attenuating in the violet and/or ultraviolet wavelength range.

4. Measuring system according to claim 1, wherein the measured object is designed of a transparent plastic.

5. Measuring system according to claim 4, wherein the transparent plastic comprises at least one of a lens, a disk of a vehicle headlight, and a vehicle tail light.

6. Measuring system according to claim 1, wherein the light source is formed of a laser that emits a laser beam as the illumination light beam.

7. Measuring system according to claim 1, wherein the illumination light beam has a wavelength less than or equal to 425 nm.

8. Measuring system according to claim 1, wherein the illumination light beam has a wavelength smaller than or equal to 405 nm.

9. Measuring system according to claim 1, wherein the illumination light beam has a wavelength less than or equal to 390 nm.

10. Measuring system according to claim 1, wherein the illumination light beam illuminates the measured object in the form of a spot, as crossed lines and/or as several parallel lines.

11. Measuring system according to claim 1, wherein a focusing device is arranged after the light source, via which the illumination light beam is focused.

12. Measuring system according to claim 1, wherein the detector comprises at least one of a CMOS array and a CCD array.

13. Measuring system according to claim 12, wherein the array is designed as at least one of a linear array and an area array.

14. Measuring system according to claim 1, wherein the detector comprises at least one of a position-sensitive diode (PSD) and an avalanche photo diode (APD).

15. Measuring system according to claim 1, wherein for blocking outside radiation, a wavelength-selective element is arranged before the detector, whereby the wavelength-selective element is designed using a filter, a dispersive element or a dichroic mirror.

16. Measuring system according to claim 15, wherein several wavelength-selective elements are combined.

17. Measuring system according to claim 16, wherein the several wavelength-selective elements are of different types.

18. Measuring system according to claim 1, wherein an evaluation is connected to the sensor device, wherein the evaluation device determines a distance measurement based on the portion of the illumination light beam reflected on the measured object and received at the detector—received light beam.

19. Measuring system according to claim 18, wherein the evaluation unit and the sensor device are designed in such a way that a distance measurement is performed according to a triangulation method.

20. Measuring system according to claim 18, wherein the evaluation unit and the sensor device are designed in such a way that a measurement of the running time of the illumination and received light is performed or a measurement of a phase shift between a modulated illumination light beam and the received light beam is performed.

21. Measuring system according to claim 15, wherein measured object and sensor device can be shifted relative to each other and that the evaluation unit is designed in such a way that a profile of the measured object or a part of the measured object can be determined from several distance measurements.

22. Measuring system for determining a distance between a sensor device and a measured object, wherein the sensor device comprises a light source for generating an illumination light beam and a detector for detecting a portion of the illumination light beam reflected on the surface of the measured object, wherein the measured object has a surface that directly reflects visible light therefrom, wherein the illumination light beam has a wavelength in at least one of the violet range and the ultraviolet range, and wherein a coating is applied on the surface of the measured object, the coating being configured such that the illumination light beam is diffusely reflected at the surface of the measured object in such a manner that, simultaneously with the diffuse reflection of the illumination beam, the optical properties of the measured object in the visible range, directly reflecting the visible light therefrom, remain uninfluenced by the illumination light beam.

23. Measuring system according to claim 22, wherein the measured object is designed of plastic that is substantially impermeable to light.

24. Measuring system according to claim 22, wherein the measured object is designed of at least one of a metal, a wood and a paper material.

\* \* \* \* \*